United States Patent
Choi

[11] Patent Number: 5,822,461
[45] Date of Patent: Oct. 13, 1998

[54] DEVICE FOR DETERMINING A QUANTIZING NUMBER OF AN IMAGE SIGNAL

[75] Inventor: Byeong Ho Choi, Chunju, Rep. of Korea

[73] Assignee: LG Electronics, Inc., Seoul, Rep. of Korea

[21] Appl. No.: 649,275

[22] Filed: May 17, 1996

[30] Foreign Application Priority Data

May 19, 1995 [KR] Rep. of Korea .................. 1995 12568

[51] Int. Cl.$^6$ ................................ G06K 9/36; G06K 9/46
[52] U.S. Cl. ........................... 382/250; 382/239; 382/251
[58] Field of Search .................................... 382/239, 250, 382/251; 348/400, 404, 405, 406, 419, 420; 358/433

[56] References Cited

U.S. PATENT DOCUMENTS

| | | |
|---|---|---|
| 5,051,840 | 9/1991 | Watanabe et al. . |
| 5,263,100 | 11/1993 | Kim et al. ................................ 382/239 |
| 5,333,012 | 7/1994 | Singhal et al. ........................... 348/405 |

FOREIGN PATENT DOCUMENTS

| | | |
|---|---|---|
| 0553361A1 | 8/1993 | European Pat. Off. . |
| 0582819A2 | 2/1994 | European Pat. Off. . |
| 0618733A2 | 10/1994 | European Pat. Off. . |
| 9319434 | 9/1993 | WIPO . |

*Primary Examiner*—Phuoc Tran

[57] ABSTRACT

A device for determining quantizing number of an image signal comprises a discrete cosine transformation for generating a discrete cosine transformation signal by transforming image data, a segment delay unit for delaying the discrete cosine transformation signal for prescribed time, a quantization unit for quantizing data output from the segment delay unit, a variable coding unit for variably coding data output from the quantizing unit, a formatter for converting data output from the variable coding unit into an appropriate form, an activity calculation unit for counting a number of a discrete cosine transformation signal in a macro block unit and for calculating activity, a target bit calculation unit for calculating a target bit based on the data output from the activity calculation unit, a code length calculation unit for calculating quantizing and a code length of said discrete cosine transformation signal, the code length calculation unit quantizing and variably coding the discrete cosine transformation coefficient of the discrete cosine transformation, a comparison unit for comparing the code length signal multiple calculated by the code length calculation unit with the target bit calculated by the target bit calculating unit, and a quantizing number determination unit for determining a quantizing number based on data output from the comparison unit and for outputting quantizing number to the quantization unit.

12 Claims, 5 Drawing Sheets

DEVICE FOR DETERMINING A QUANTIZING NUMBER OF AN IMAGE SIGNAL

BACKGROUND OF THE INVENTION

The present invention relates to a device for compressing an image signal, and more particularly to a device for determining a quantizing number corresponding to an image signal.

In the conventional image system, image data is input via an analog signal. This analog image data is converted into digital image data by an analog/digital (A/D) converter, and the resulting digital data is converted into the frequency dependent signal based on a discrete cosine transformation (DCT). The energy of the frequency dependent signal is concentrated in a low frequency region used to generate a transformation coefficient of the DCT that is converted into a reference quantity by a quantizing process, which reference quantity is used during a compression process performed on the data. More specifically, the reference quantity is read from the low frequency region by a zigzag scan, so that the data is converted into bit stream data by run-length coding and the image is compressed.

In the aforementioned image system, the quantization is the most important factor of the scene quality and the size of the generated bit stream data. Since the data is incrementally divided in step by the quantizing process, the scene quality and the size of the generated bit stream data are varied by the step size.

Conventionally, to maintain the scene quality in an optimum state, the size of the bit stream data is controlled based on the available capacity of a buffer, which capacity is calculated in a macro block unit when the available capacity of the buffer is relatively small, the quantizing reference quantity is increased and the size of the generated bit stream data is decreased, as shown in FIG. 1. Further, when the available capacity of the buffer is relatively large, the quantizing reference quantity is decreased and the size of the generated bit stream data is increased. By decreasing an increasing the size of the generated bit stream data, the amount of data transferred is controlled to prevent the emptiness of the buffer.

FIG. 2 is a view showing a quantizing matrix for a block of coding type in a screen. The method used for this block of coding type is a method for controlling the amount of the beat of MPEG-2. The convention algorithm is indicated as follows:

The state of the buffer is defined by equation (1).

$$BufferStat(j) = InitBuffer + GenBits\ (j-1) - TargetBit\ per\ MB(j-1) \quad (1)$$

where, BufferStat(j) represents the state of the buffer, InitBuffer represents the available space in the buffer at initial state of the screen, GenBits(j-1) represents a number of bits generated up to the (j-1)th macro block, and TargetBit represents the target bit for the macro block.

The quantizing reference quantity (RefQuant(j)) is:

$$RefQuant(j) = BufferStat(j) \times 31 / ReactParam \quad (2),$$

where ReactParam is illustrated by eg. (3):

$$ReactParam = 2 \times bit\ rate / Picture\ rate \quad (3).$$

The activity (Activity) of the macro block is defined by eg. (4):

$$Activity = 1\ min[Bi\text{-}Variance(j,k)] \quad (4),$$

for j=0, 1, 2, . . . , MBcnt-1, and fair k=1, 2, 3, 4, where min[Bi-Variance(j,k)] is the minimum value of the (j,k)th block variance. The normal activity is defined based on the following relationship:

$$Normal\ Activity = \frac{[2 \times Activity(j) + Aver - Activity]}{[Activity(j) + 2 \times Aver - Activity]}, \quad (5)$$

where Aver-Activity is the activity average. The quantizing quantity of the macro block (Mquant(j)) is obtained by multiplying eg. (2) and (5):

$$Mquant(j) = RefQuant(I) \times Normal\ Activity(j) \quad (6).$$

Therefore, the generated bit stream can be controlled by carrying out the quantizing process according to the quantizing quantity of the jth macro block.

In the above mentioned quantizing process, however, the scene quality is deteriorated by hard conversion of the scene and by the edge blurring phenomenon. It is therefore difficult to apply the conventional technique to a coding system in which data is packed into a defined space.

SUMMARY OF THE INVENTION

An object of the present invention is to improve upon the conventional system described above.

Another object of the present invention is to provide a device for determining a quantum number corresponding to an image signal in which a target bit is determined based on the calculation of the activity of discrete cosine transformation coefficient, the length of the code for the discrete cosine transformation coefficient is obtained, and the quantizing number is determined for achieving optimum quantization by comparing the target bit and the length of the code.

In order to achieve these and other objects, the present invention comprises a discrete cosine transformation means for transforming the image data, a segment delay means for delaying the data inputted from the discrete cosine transformation means for prescribed time, a quantization means for quantizing inputted from the segment delay means, a variable decoding means for decoding the quantizied data by the quantization means, a formatter for arranging the data inputted from the variable decoding means in a suitable form to the system, an activity calculation means for calculating activity by counting the discrete cosine transformation coefficient transformed by the discrete cosine transformation means in macro block unit, a target bit calculation means for calculating the target bit of the data which is inputted from the activity calculation means in macro block unit, a code length calculation means for calculating the generated bit by quantizing and decoding variably the discrete cosine transformation coefficient of the discrete cosine transformation means, a comparison means for comparing the code length calculated by the code length calculation means and the target bit calculated by the target bit calculation means, and a quantizing number determination means for determining and outputting the quantizing number by calculating the data inputted from the comparison means.

The activity calculation means comprises a comparator for comparing the coefficient data of the discrete cosine transformation means with 2, a counter for counting the coefficient data more than 2, and an adder for adding coefficient of the counter in macro block unit.

The target bit calculation means comprises a multipliers for multiplying sum of the coefficient of the activity calculation means by the segment target bit, an adder for adding output of the multiplier, and the dividers for dividing the output of the multipliers by sum of the segment of the adder to obtain the target bit for the macro block.

BRIEF DESCRIPTION OF THE INVENTION

DETAILED DESCRIPTION OF THE INVENTION

Figures 1, 2:
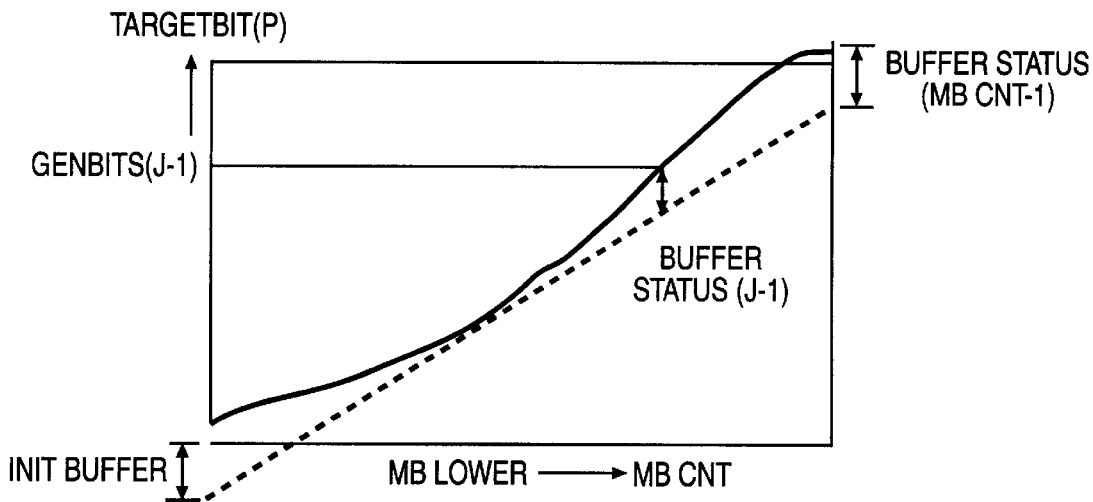
FIG. 1 is a view showing the traces control of the buffer during coding of the image data.
FIG. 2 is a quantizing number matrix for the block of coding type in the scene.
Figure 3:
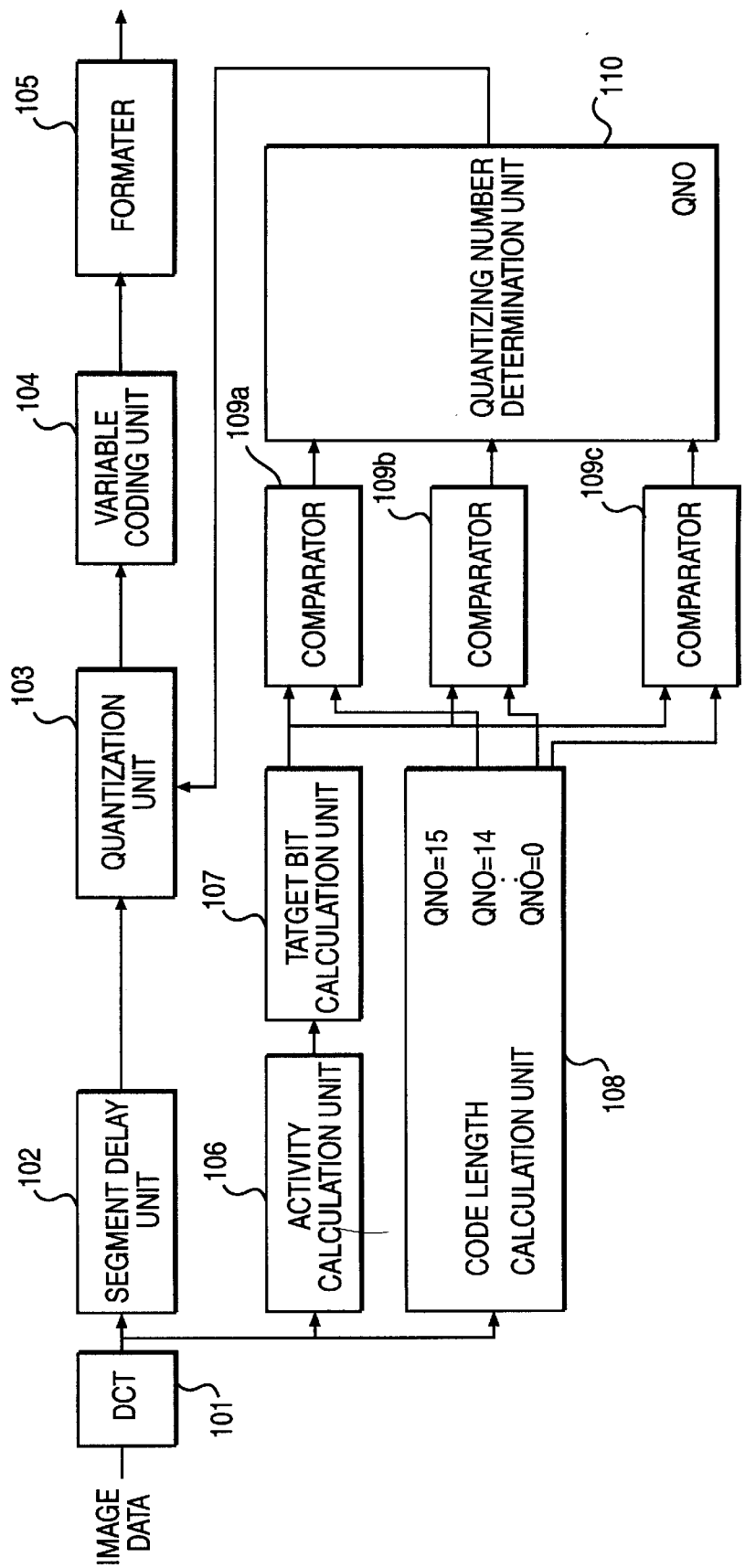
FIG. 3 is a view showing structure of the quantizing number determining device according to the present invention.

Referring to FIG. 3, the quantizing number determining device according to the present invention comprises a discrete cosine transformation unit DCT 101 for transforming the image data, a segment delay unit 102 for delaying the data input from the DCT 101 for prescribed time, a quantization unit 103 for quantizing the data input from the segment delay unit 102, a variable coding unit 104 for variable coding data input from the quantization unit 103, a formatter 105 for arranging data input from the variable coding unit 104 in suitable form for output, an activity calculation unit 106 for performing calculations on the data input from the DCT 101, a target bit calculation unit 107 for performing calculations on data input from the activity calculation unit 106 and for outputting a target bit, a code length calculation unit 108 for performing calculations on data input from the DCT 101 and for outputting the sum of the length of 16 codes, comparators 109a–109o for comparing the sum of the code length input from the code length calculation unit 108 and the target bit input from the target bit calculation unit 107, and a quantizing number determination unit 110 for performing calculations on the data input from the comparators 109a–109o to determine the quantizing number and for outputting the determined quantizing number to the quantization unit 103.

Figure 4:
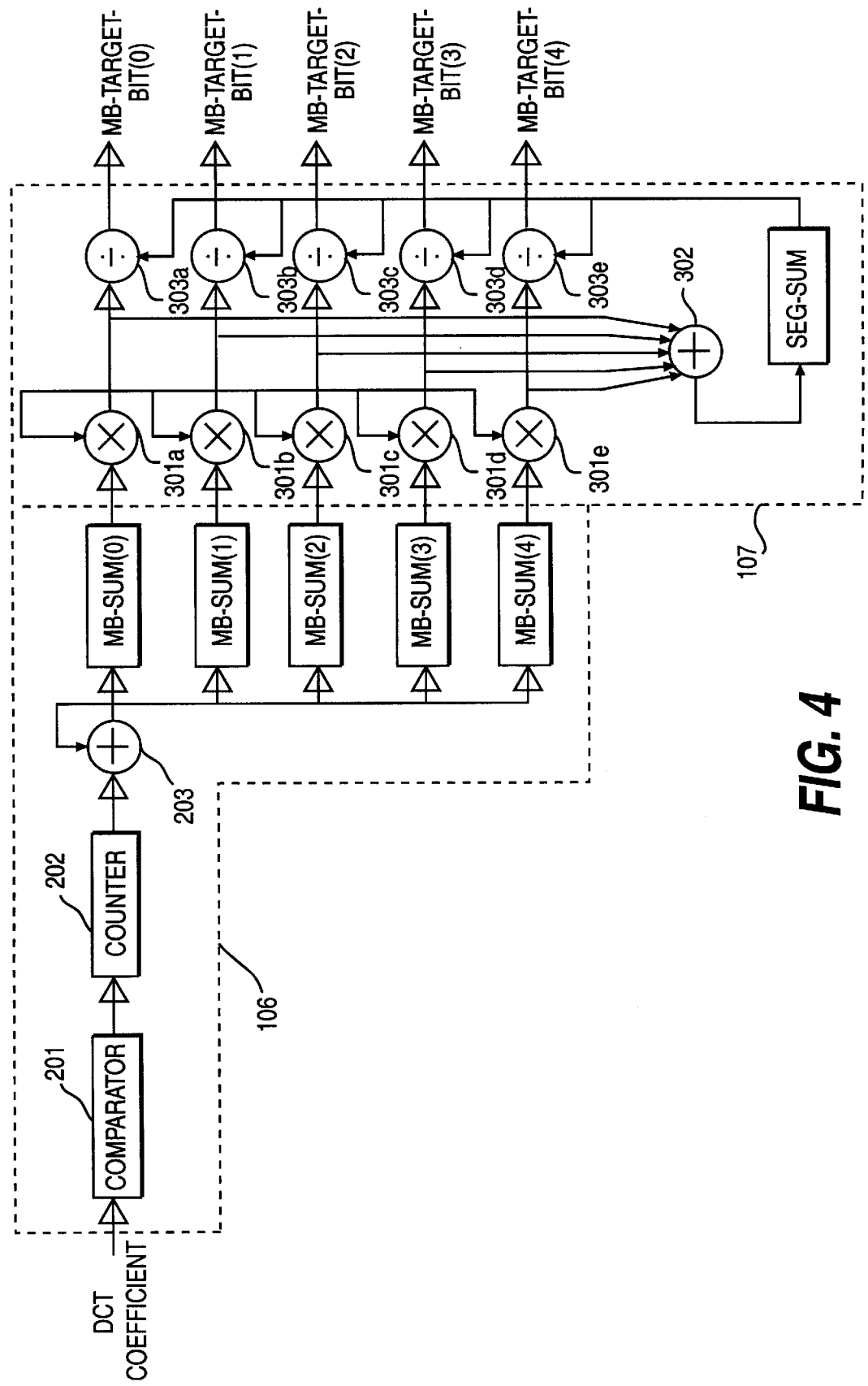
FIG. 4 is a view showing structure of the activity calculation unit and the target bit calculation unit of FIG. 3.

As shown in FIG. 4, the activity calculation unit 106 comprises a comparator 201 for comparing the coefficient of the DCT 101 with two (2) to determine whether the coefficient is zero (0) or one (1), a counter 202 for counting coefficients exceeding two (2), and an adder 203 for adding the coefficient counted by the counter 202 to obtain the sum of the coefficients of the macro blocks (MB–sum(0), . . . MB–sum(4)).

The target bit calculation unit 107 comprises multiplier 301a–301e for multiplying the sum of coefficients output from activity calculation unit 106 by the value of the segment target bit (e.g., 2680), an adder 302 for adding the value output from the multiplier 301a–301e to obtain the sum of the segment, and dividers 303a–303e for dividing the value outputted from the multipliers 301a–301e by the sum of the segment of the adder 302 to obtain the target bit.

In the above mentioned quantizing number determination device, when the analog signal representing the image data is input into the image system, it is converted into digital data by the analog/digital converter (not shown) before being converted into the frequency dependent signal by the DCT 101. The transformed signal is input to the comparator 201 of the activity calculation unit 106, which judges whether the discrete cosine transformation coefficient is above two (2). The number of the discrete cosine transformation coefficient more than two (2) is counted by the counter 202. The value counted by the counter 202 is added by the adder 203 to obtain the sum of the activity coefficient of the macro block unit including macro blocks MB–sum(0), MB–sum(1), . . . MB–sum(4). The sum is then output to the target bit calculation unit 107.

In this case, the number of the discrete cosine transformation coefficient is an important factor of the complex degree of the scene. However, since the small coefficient does not affect the complex degree of the scene, the activity calculation unit 106 ignores the two (2) lower bits of the coefficient. Thus, the output of the activity calculation unit 106 is multiplied by the value of the target bit for one (1) segment (e.g., 2680), to obtain the segment bit. The segment bit is added by the adder 302 to become the sum of the segment. Again, the segment bit is divided by the sum of the segment by the dividers 303a–303e to obtain the ratio for the sum of the segment, so that the target for five macro blocks is obtained.

The target bit for 1 segment and 1 macro block is $$1\ seg\text{--}Target\text{--}bit = 1\ synchronous\ block \times 5 \times 8\ bit = 77\ bytes \times 5 \times 8\ bit = 2680\ bit \quad (7),$$

1 synchronous block (macro block) target bit equals, $$MB\text{--}Target\text{--}bit = \qquad\qquad (8)$$

$$MB\text{--}sum(i) / \sum_{i=1}^{4} MB\text{--}sum(i) \times 2680\ bit,$$

where seg–Target–bit is the target for one segment and MB–Target–bit is the target for one macro block. In eq. (8), when the compressed image data is restored, the target bit is the optimum number of the bit for restoration of the scene quality of the five macro block equally.

Figure 5:
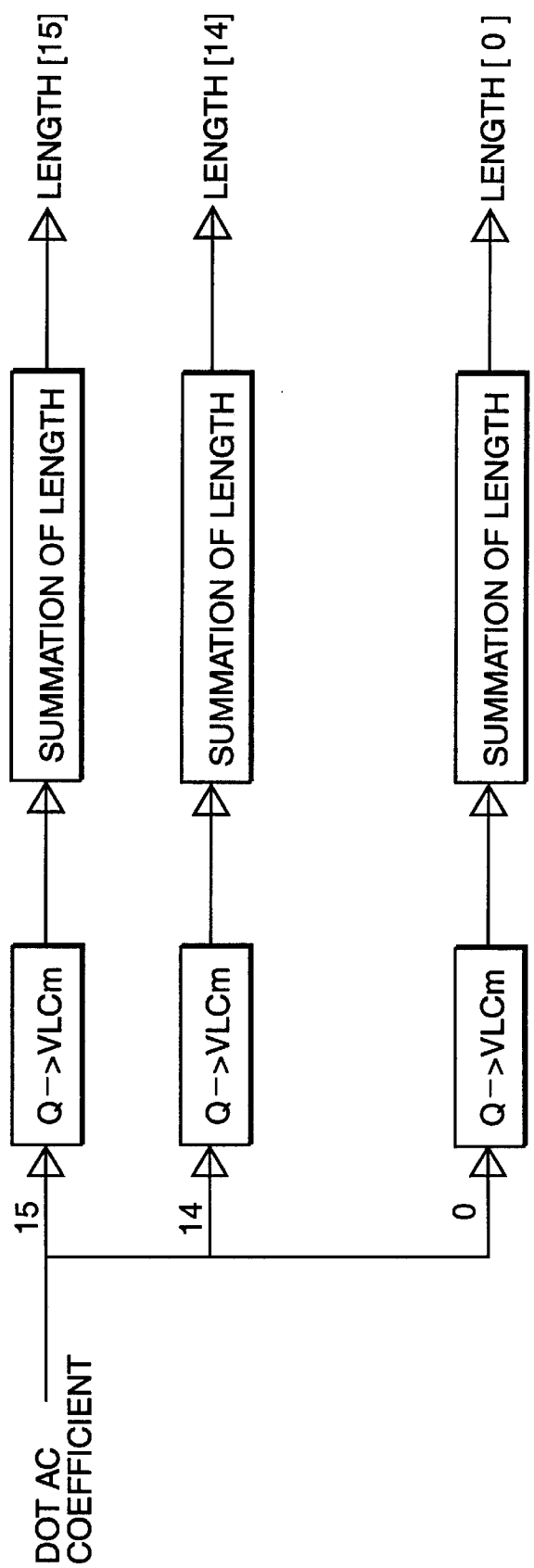
FIG. 5 is a view showing structure of the code length calculation unit of the FIG. 3.

Further, when the number of bits corresponding to the appropriate scene quality is estimated in the target bit calculation unit 107 by calculating the activity in the activity calculation unit 106, six transformation coefficients of the DCT 101 is quantizied and coded by the code length calculation unit 108 to obtain the practical code length as shown in FIG. 5. Accordingly, in the comparators 109a–109o, the target bit for macro block of the target bit calculation unit 107 is compared with the six code length obtained by the code length calculation unit 108. In the quantizing number determination unit 110, the value input from the comparators 109a–109o is calculated to identify the code length closest to the target bit, a value corresponding to the identical code length is output to the quantizing unit as a quantizing number.

Figure 6:
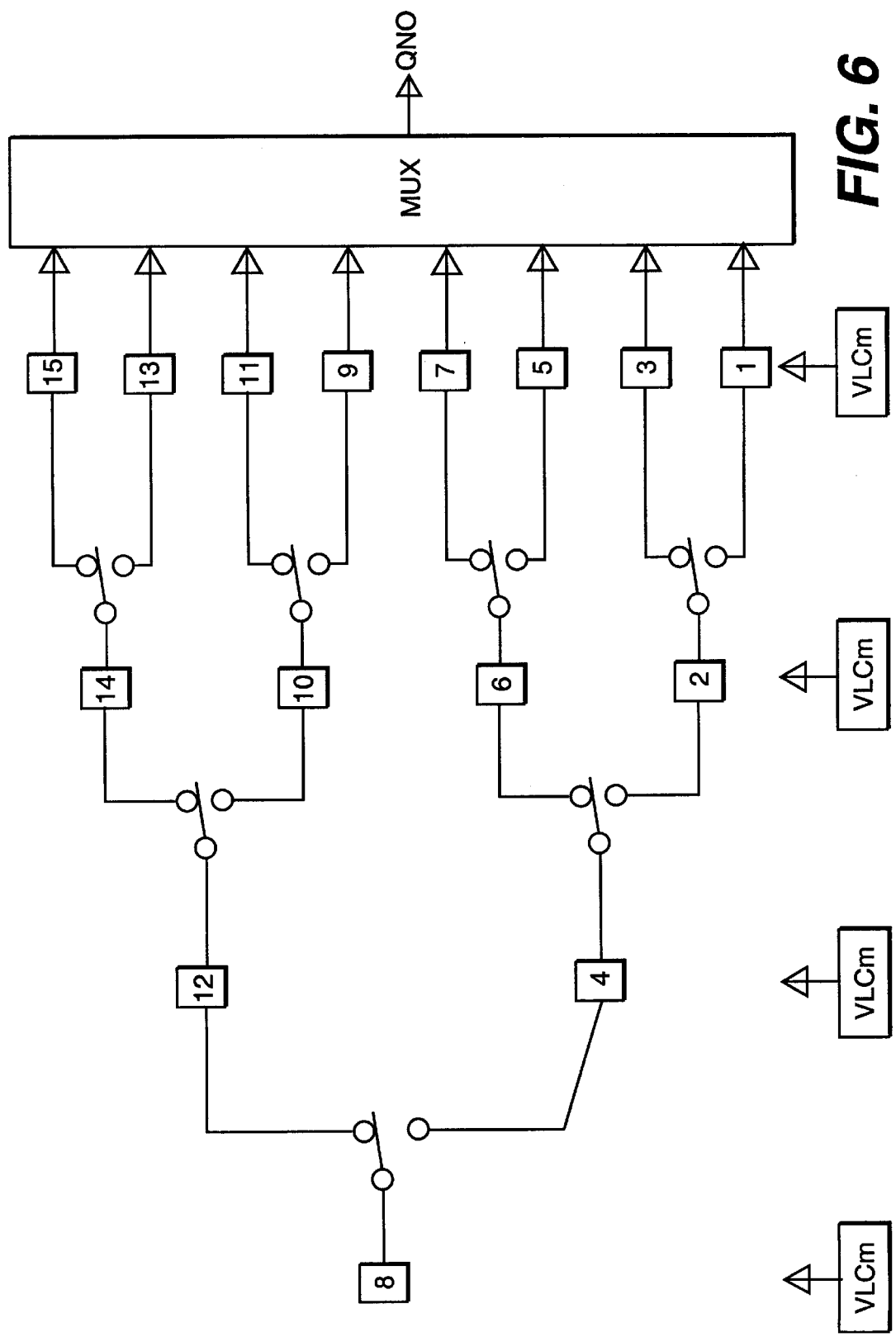
FIG. 6 is a view showing calculating operation of the code length.

FIG. 6 is a view showing a binary tree structure for carrying out the quantization and variable coding process. In this figure, the complex degree of the hardware for determination of the quantizing number (Qno) is decreased. If the practical number of the bit of the discrete cosine transformation coefficient is larger than the target bit for the macro blocks, the upper tree path of FIG. 6 is carried out. On the contrary, if the number of the bit is smaller than the target bit, the lower tree path is carried out. In this case, since the multiplexer is used, only one variable coder is needed for the respective step.

While the number of bits corresponding to appropriate the scene quality is estimated by the activity calculation unit 106 and the target bit calculation unit 107, the practical coding process for the discrete cosine transformation coefficient is carried out by the code length calculation unit 108, and the quantizing number is calculated by the comparator 109 and the quantizing number determination unit 110, the data inputted from the DCT 101 is delayed in the segment delay unit 102 and outputted to the quantization unit 103. In the quantization unit 103, the transformation coefficient of the DCT inputted through the segment delay unit 102 according to the quantizing number determination unit 110 is quantizied and converted into the reference quantity.

In the variable coding unit 104, the reference quantity of the quantization unit 103 is read from the low frequency region by a zigzag scan, so that the data becomes run-length coding and then the bit stream data. The bit stream data is converted in the appropriate form to the system by the formatter 105 to compress the image data.

Although the activity is calculated by obtaining the number of the coefficient in the macro block unit, in the present invention, the activity can be obtained by obtaining the number of the coefficient directly.

In addition, when the code length for the discrete cosine transformation coefficient is calculated, the bit sum of eight can be obtained using only eight modules for quantization and the variable coding, so that the bit sum of six can be calculated.

$$Q21 = (Q2i - Q2(i-1))/2 = Qi \tag{9}$$

After the bit sum is obtained using the six modules for quantization and variable coding, the bit sum of twelve can be calculated.

$$Q3i - ((Q3i - Q3(i-1))/3) = Q3i-1 \tag{10}$$

$$Q3i - \{(Q3i - Q3(i-1))/3\} \times 2 = Q3i-2 \tag{11}$$

In the aforementioned quantizing number determination device of the image signal, since the target bit is calculated based on the activity, the data not used by the formatter algorithm is minimized and the quantization process is carried out efficiently. In addition, the scene quality of the scene is improved because the image data is recorded in a recording space having a predetermined size so that the scene quality is equally distributed by the efficient quantization process.

Having described out invention as related to the embodiment shown in the accompanying drawing, it is our intention that the invention be not limited by any of the details of description, unless otherwise specified, but rather be construed broadly within its spirit and scope as set out in the accompanying claims.

What is claimed is:

1. A device for determining a quantizing number of an image signal, comprising:

discrete cosine transformation means for generating a discrete cosine transformation signal by transforming image data;

segment delay means for delaying said discrete cosine transformation signal for prescribed time;

quantization means for quantizing said delayed discrete cosine transformation signal output from said segment delay means;

variable coding means for variably coding data output from said quantization means;

a formatter for converting data output from said variable coding means into an appropriate form;

activity calculation means for counting a number of a discrete cosine transformation coefficient of said discrete cosine transformation signal and for calculating activity in a macro block unit;

target bit calculation means for calculating a target bit based on said data output from said activity calculation means;

code length calculation means for calculating a code length of said discrete cosine transformation signal, said code length calculation means quantizing and variably coding said discrete cosine transformation coefficient of said discrete cosine transformation signal;

multiple comparison means for comparing said code length calculated by said code length calculation means with said target bit calculated by said target bit calculation means; and quantizing number determination means for determining a quantizing number based on data output from said comparison means and for outputting said quantizing number to said quantization means.

2. A device for determining a quantizing number of an image signal according to claim 1, wherein said delayed discrete cosine transformation signal output from said segment delay means is converted into a reference quantity by said quantization means.

3. A device for determining a quantizing number of an image signal according to claim 1, wherein said variable coding means converts a reference quantity from said quantization means into bit stream data.

4. A device for determining a quantizing number of an image signal according to claim 3, wherein said reference quantity is read from low frequency region by a zigzag scan for run length coding by said variable coding means.

5. A device for determining a quantizing number of an image signal according to claim 1, wherein said activity calculation means comprises:

a comparator for comparing said discrete cosine transformation coefficient of said discrete cosine transformation signal with a prescribed value;

a counter for counting said number of said discrete cosine transformation coefficient; and a plurality of adders for adding said number of said discrete signal transformation coefficient counted by said counter.

6. A device for determining a quantizing number of an image signal according to claim 5, wherein said number of said discrete cosine transformation coefficient corresponds to a macro block unit of 5.

7. A device for determining a quantizing number of an image signal according to claim 5, wherein said prescribed value is 2.

8. A device for determining a quantizing number of an image signal according to claim 5, wherein said counter counts a value of said discrete cosine transformation coefficient other than 0.

9. A device for determining a quantizing number of an image signal according to claim 5, wherein said counter counts a value of said discrete cosine transformation coefficient other than 0 and 1.

10. A device for determining a quantizing number of an image signal according to claim 5, wherein said counter counts said discrete cosine transformation coefficient other than 0, 1, and 2.

11. A device for determining a quantizing number of an image signal according to claim 5, wherein said target bit calculation means comprises:

a plurality of multipliers for multiplying said number of said discrete cosine transformation coefficient output from said activity calculation means by a segment target bit;

an adder for adding outputs from said multipliers; and a plurality of dividers for dividing respective outputs from said multipliers by a sum outputted from said adder.

12. A device for determining a quantizing number of an image signal according to claim 11, wherein said segment target bit satisfies the following relation:

$$1\ seg\text{-}Target\text{-}bit = 1\ synchronous\ block \times 5 \times 8\ bit = 77\ byte \times 5 \times 8\ bit = 2680\ bit.$$

where seg–Target–bit represents said segment target bit.

\* \* \* \* \*